United States Patent [19]

Mizuno et al.

[11] Patent Number: 5,606,479
[45] Date of Patent: Feb. 25, 1997

[54] MAGNETIC HEAD

[75] Inventors: Yasuo Mizuno, Katano; Yoshihiro Hori, Hirakata; Masaki Ikeda, Hirakata; Akihiko Yoshida, Hirakata, all of Japan

[73] Assignee: Matsushita Electric Industrial Co., Ltd., Osaka, Japan

[21] Appl. No.: 355,066

[22] Filed: Dec. 13, 1994

Related U.S. Application Data

[63] Continuation-in-part of Ser. No. 49,173, Apr. 19, 1993, abandoned.

[30] Foreign Application Priority Data

Apr. 21, 1992 [JP] Japan .................................. 4-100846

[51] Int. Cl.$^6$ .................................................. G11B 5/127
[52] U.S. Cl. .......................... 360/126; 360/103; 360/122; 501/41; 501/49; 428/692
[58] Field of Search ................................ 360/103, 104, 360/122, 110, 126; 501/41, 49; 428/692

[56] References Cited

U.S. PATENT DOCUMENTS

| | | | |
|---|---|---|---|
| 4,406,722 | 9/1983 | Chow et al. | 156/89 |
| 4,642,719 | 2/1987 | Morita et al. | 360/126 |
| 4,855,261 | 8/1989 | Mizuno et al. | 501/76 |
| 5,016,129 | 5/1991 | Goto et al. | 360/103 |
| 5,086,553 | 2/1992 | Goto et al. | 29/603 |
| 5,204,290 | 4/1993 | Mizuno et al. | 501/14 |
| 5,208,713 | 5/1993 | Lindsay et al. | 360/105 |
| 5,224,001 | 6/1993 | Mizuno et al. | 360/125 |
| 5,245,492 | 9/1993 | Mizuno et al. | 360/125 |
| 5,273,948 | 12/1993 | Yamazaki et al. | 501/75 |

FOREIGN PATENT DOCUMENTS

| | | |
|---|---|---|
| 55-135326 | 10/1980 | Japan . |
| 58-143428 | 8/1983 | Japan . |
| 63-050906 | 3/1988 | Japan . |
| 63-201905 | 8/1988 | Japan . |
| 01088906 | 4/1989 | Japan . |
| 1138151 | 5/1989 | Japan . |
| 2217508 | 10/1989 | United Kingdom . |

OTHER PUBLICATIONS

Kishii, New Glass Technology, 1(3), 1982, pp. 23–31, "Setting Temperature".

Japanese Industrial Standard, JIS, R3102–1978, "Testing Method for Average Linear Thermal Expansion of Glass".

Tang, "Stress Analysis of Glass–Bonded Ferrite 'Recording Heads'", IBM Journal of Research & Develpment, vol. 18, No. 3, May 1974, pp. 274–78.

Search Report for European Appl. 93106473.7, mailed Jul. 8, 1993.

Glass Handbook, Pub. by K. Asakura, Sep. 30, 1975, pp. 138–139, "6.2 Stress Generated in Sealed Substance".

Tuchihashi, Chemistry of Glass, Apr. 24, 1972, pp. 120–121, "Differential Thermal Analysis of Glass".

*Primary Examiner*—Stevan A. Resan
*Attorney, Agent, or Firm*—Renner, Otto, Boisselle, & Sklar, P.L.L.

[57] ABSTRACT

A magnetic head of the present invention includes a pair of substrates which are formed of ferrite and sealed with sealing glass, wherein an averaged thermal expansion ratio of the sealing glass in the range of 30° C. to a setting temperature $\alpha_{Ts}$ (glass) is smaller than an averaged thermal expansion ratio of the substrate in the range of 30° C. to a setting temperature $\alpha_{Ts}$ (substrate); and a difference between a thermal expansion ratio at a glass transition temperature of the sealing glass and a thermal expansion ratio at a yielding temperature thereof is $2\times10^{-3}$ or less.

11 Claims, 4 Drawing Sheets

MAGNETIC HEAD

CROSS REFERENCE TO RELATED APPLICATION

This application is a continuation-in-part of application Ser. No. 08/049,173, filed on Apr. 19, 1993, now abandoned.

BACKGROUND OF THE INVENTION

1. Field of the Invention

The present invention relates to a magnetic head of high performance used in various kinds of magnetic recording devices for households, broadcasting stations, etc. More specifically, the present invention relates to a magnetic head in which chip cracks are rarely caused due to improved thermal compatibility between a substrate and sealing glass.

2. Description of the Related Art

In recent years, miniaturized lightweight magnetic heads have been developed along with the increase in recording density of a recording medium such as a VTR. Since it is difficult to manufacture miniaturized lightweight magnetic heads with precision, the manufacturing yield thereof is not high. The reason for such a low yield mainly lies in chip cracks. This is caused by a number of cracks formed in the sealing glass at the time when the magnetic head is formed into chips. Because of this, there has been a demand for a magnetic head with an improved manufacturing yield.

A typical process for manufacturing a magnetic head for a VTR will be described with reference to FIG. 3.

a) A substrate material is cut from a magnetic material such as ferrite ingot;

b) The outside of the cut substrate material is ground in order to obtain a substrate of a predetermined size;

c) Grooves for introducing sealing glass are formed in the substrate;

d) Grooves are filled with sealing glass;

e) Excess glass is removed by grinding, other gaps (grooves) for coiling wire are formed in the resulting substrate, and the gap surface is ground;

f) Gap materials (e.g., $SiO_2$ or the like) are sputtered on the surface of the two substrates, one substrate for an S-pole is layered on top of the other substrate for an N-pole, and the sealing glass is sealed by heating, whereby a sealed gap is formed;

g) The substrate thus obtained is cut into chips;

h) The side of the chip is ground to a predetermined size;

i) The chip is attached to a base;

j) The surface on which a video tape contact is made polished; and k) The resulting chip is coiled with wire in order to obtain a magnetic head.

In such a magnetic head, the sealing glass and the substrate have different thermal expansion ratio. Therefore, when the substrate is sealed with the sealing glass at high temperatures, the glass becomes distorted by either tensile stress or compression stress at room temperature. In the magnetic head described above, sealing glass in which compression stress is considered to be applied in a solidified state, i.e., at room temperature is selected. The reason for this is as follows:

Glass is relatively strong against compression stress but relatively weak against tensile stress, and the strength of glass against tensile stress is 1/10 or less that of the strength against compression stress thereof. That is to say, glass is weak against tensile strength, so that glass is likely to be broken due to the generation of tensile stress. From this viewpoint, it is considered that the manufacturing yield can be improved when the sealing glass in which compression stress is applied at room temperature is selected.

FIG. 5 shows the relationship between the thermal expansion ratio and the temperature of four kinds of glass materials, U, V, X, and Y, each having a different thermal expansion profile and that of ferrite used in a magnetic head. Compositions (% by weight) of the glasses U, V, X, and Y are shown in Table 1.

FIG. 6 shows results obtained by sealing ferrite with the glass materials U, V, X, and Y and determining the stress applied at room temperature on the interface between the ferrite and the glass material. In FIG. 6, $\alpha_{300}$ denotes an averaged thermal coefficient of expansion in the range of 30° to 300° C. As shown in FIG. 6, in the glass materials X and Y, compression stress is generated; and in the glass materials U and V, tensile stress is generated. In a magnetic head using the glass materials X and Y, chip cracks are rarely caused; and in magnetic heads using the glass materials U and V, chip cracks are more than likely to be caused.

TABLE 1

|  | X | Y | U | V |
|---|---|---|---|---|
| Composition by weight (%) | | | | |
| $B_2O_3$ | 22 | 22 | 15 | 10 |
| PbO | 47 | 37 | 35 | 30 |
| ZnO | 9 | 9 | 5 | 5 |
| CdO | 7 | 7 | 10 | 20 |
| $TeO_2$ | 10 | 20 | 30 | 35 |
| $Bi_2O_3$ | 5 | 5 | | |
| $La_2O_3$ | | | 5 | |

Thus, the condition for suitable sealing glass is that the sealing glass has a thermal expansion characteristic which causes compression stress within a certain range to be generated at room temperature when used to seal in materials for a substrate (ferrite). This condition is disclosed in Japanese Laid-Open Patent Publication No. 1-138151 by the inventors of the present invention.

If a sealing glass is selected in accordance with this disclosed condition, chip cracks can greatly be decreased for some glass materials; however, chip cracks are still generated depending upon the kind of glass materials. Thus, this disclosed condition is not sufficient for the selection of sealing glass. Even though sealing glass having an averaged thermal expansion ratio in the range of room temperature to a sealing temperature of the sealing glass smaller than that of the substrate is selected, so that compression stress within a certain range is generated at room temperature, chip cracks cannot be reduced.

Moreover, in a metal in gap (MIG) head (described later) which has recently come into use, there arises a problem of the decrease in yield caused by a higher frequency of chip cracks. Conventionally, as a magnetic material for a VTR head, the above-mentioned material such as ferrite has most widely been used. However, ferrite which has recently come into use cannot be applied to high density recording medium such as metal tape, because of the low saturation magnetic flux density thereof. In a high density and high quality recording system for a broadcasting station and for an S-VHS, ferrite cannot be used alone. In these cases, a magnetic substrate obtained by sputtering a sendust alloy, an amorphous alloy, or the like, on a ferrite substrate is used in place of a ferrite substrate. A magnetic substrate which is a ferrite substrate having a super-structured nitride alloy on the surface of the ferrite substrate can also be used. The term "super-structured nitride alloy" is referred to as an multi-layered structure of alloys, the structure having alternate arrangement of amorphous alloy layers and amorphous nitride alloy layers. Usually, the structure is prepared by the sputtering process including alternate sputtering of alloy target in an inert gas atmosphere and in a mixed gas atmosphere containing nitrogen and an inert gas. Generally, the alloy target is M—X wherein M is Co or Fe, and X is at least one selected from the group consisting of Nb, Zn, Bi, and Si. High density and high quality magnetic heads using these magnetic substrates are called MIG heads. The difference in a manufacturing method between the above-mentioned magnetic head and the MIG head is in that the step for forming a magnetic film on the above-mentioned alloy on the ferrite substrate is added between the steps b) and c).

The problem with the MIG head is that the mechanical strength of the sealing glass is further deteriorated compared with a head using ferrite. That is, in the step g) for cutting them into chips, a number of cracks are generated in the sealing glass, resulting in a poor manufacturing yield. In the MIG head in which a magnetic substance obtained by sputtering a sendust alloy, an amorphous alloy, a superstructured nitride alloy, or the like on a ferrite substrate, is used in place of ferrite alone, since the magnetic characteristics of those magnetic materials change due to heat, it is required that the sealing temperature is set at 600° C. or less. For example, when glass having a high PbO content with a low melting point is used, a sealing temperature can be set at 600° C. or less. However, this type of glass with a low melting point has a remarkably deteriorated mechanical strength for sealing, compared with glass having a relatively high melting point for sealing the usual ferrite core, i.e., glass having a sealing temperature in the range of 700° C. to 900° C. For this reason, in the MIG head using glass with a low melting point, a number of chip cracks are generated in the step g) for cutting them into chips. For industrial production of the MIG head, it is required that chip cracks are reduced and the yield is improved.

SUMMARY OF THE INVENTION

The magnetic head of the present invention includes a pair of substrates which are formed of ferrite and sealed with sealing glass. In this magnetic head, an averaged thermal expansion ratio of the sealing glass in the range of 30° C. to a setting temperature $\alpha_{T_S}$ (glass) is smaller than an averaged thermal expansion ratio of the substrate in the range of 30° C. to a setting temperature $\alpha_{T_S}$ (substrate); and the difference between the thermal expansion ratio at the glass transition temperature of the sealing glass and the thermal expansion ratio at the yielding temperature thereof is $2\times10^{-3}$ or less.

According to another aspect of the present invention, the magnetic head includes a pair of substrates which are formed of a magnetic substance with high magnetic permeability and high saturation magnetic flux density on a ferrite substrate and sealed with sealing glass. In this magnetic head, an averaged thermal expansion ratio of the sealing glass in the range of 30° C. to the setting temperature $\alpha_{T_S}$ (glass) is smaller than an averaged thermal expansion ratio of the substrate in the range of 30° C. to a setting temperature $\alpha_{T_S}$ (substrate); and a difference between the thermal expansion ratio at a glass transition temperature of the sealing glass and the thermal expansion ratio at a yielding temperature thereof is $2\times10^{-3}$ or less.

Thus, the invention described herein makes possible the advantage of providing a magnetic head in which chip cracks are reduced by using sealing glass obtained under conditions specified herein.

This and other advantages of the present invention will become apparent to those skilled in the art upon reading and understanding the following detailed description with reference to the accompanying figures.

DESCRIPTION OF THE PREFERRED EMBODIMENTS

In the present specification, the thermal coefficient of expansion (TCE) is represented by $\Delta L/L\times\Delta T$ (unit: /°C.); and the thermal expansion ratio is represented by $\Delta L/L$ (nondimensional parameter).

In the present specification, a temperature range from a glass transition temperature to a yielding temperature (a temperature at which glass begins to deform due to its own weight) is referred to as "a glass transition region".

Figure 4:
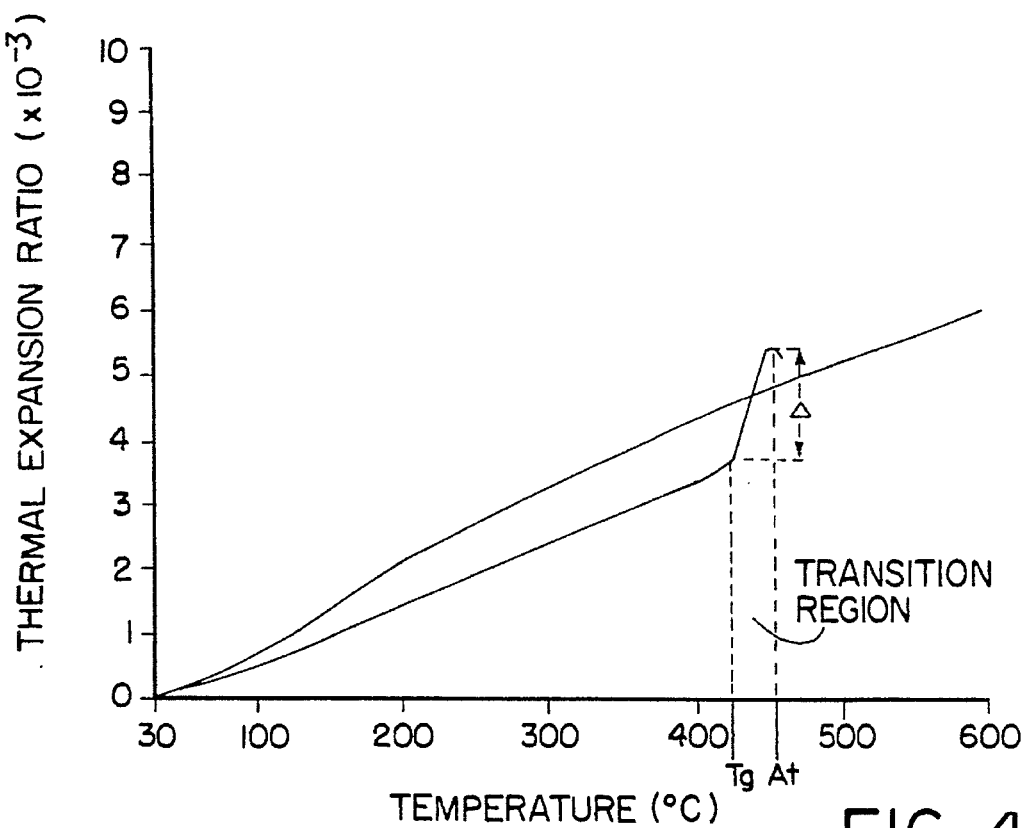
FIG. 4 shows variations in the thermal expansion ratio of typical glass and a ferrite substrate depending on temperature.

FIG. 4 shows a typical curve showing the variation of the thermal expansion ratio of glass (A) and a ferrite substrate (B) depending on temperature. In FIG. 4, an inflection point Tg on a curve A denotes a glass transition temperature and an inflection point At thereon denotes a yielding temperature. A setting temperature (denoted as Ts: the temperature at which the setting between the glass and the substrate stress starts to generate) is between the glass transition temperature Tg and the yielding temperature At. The setting temperature Ts is close to an annealing temperature (see "Class handbook" published by Asakura Shoten, p. 139 (1975)). The annealing temperature is higher than the glass transition temperature by 5° to 10° C. (see "Chemistry of glass" published by Kodansha (1985)). As shown in FIG. 4, the glass transition temperature Tg and the yielding temperature At are obtained from the thermal expansion curve of glass as inflection points; however, the annealing temperature and the setting temperature cannot be obtained from the thermal expansion curve of glass. The annealing temperature is obtained by measuring the viscosity of glass. The setting temperature is varied depending upon the shape, the thermal expansion ratio, and cooling rate of the material to be set (see New Glass Technology, 1, p. 23 (1982). As shown in FIG. 2b, the setting temperature is obtained as a temperature at which stress starts being applied to glass.

The condition under which an averaged thermal expansion ratio of sealing glass in the range of room temperature to a setting temperature becomes smaller than that of a substrate, i.e., tensile stress is not applied to the sealing glass at room temperature is as follows:

Assuming that an averaged thermal expansion ratio of sealing glass in the range of 30° C. to a setting temperature is $\alpha_{Ts}$ (glass), and an averaged thermal expansion ratio of the substrate in the range of 30° C. to a setting temperature is $\alpha_{Ts}$ (substrate), the condition is $\alpha_{Ts}$ (substrate)>$\alpha_{Ts}$ (glass).

EXAMPLES

The present invention will be described by way of illustrating examples with reference to the drawings.

EXAMPLE 1

Two kinds of magnetic heads were manufactured by the process shown in FIG. 3. As a substrate, single crystalline ferrite containing 53.75 mol % of $Fe_2O_3$, 29.5 mol % of MnO, and 16.75 mol % of ZnO was used; and two kinds of sealing glasses Y and Z having different variation curves of the thermal expansion ratio were used. Compositions (% by weight) of glasses Y and Z are shown in Table 2. Stress applied to the sealing glass during the cooling step of the magnetic heads was measured.

TABLE 2

|  | Y | Z |
| --- | --- | --- |
| Composition by weight (%) |  |  |
| $SiO_2$ |  | 5 |
| $B_2O_3$ | 22 | 8 |
| PbO | 37 | 43 |
| ZnO | 9 | 3 |
| $Al_2O_3$ |  | 2 |
| CdO | 7 | 9 |
| $TeO_2$ | 20 | 5 |
| $Bi_2O_3$ | 5 | 25 |

Figure 2A:
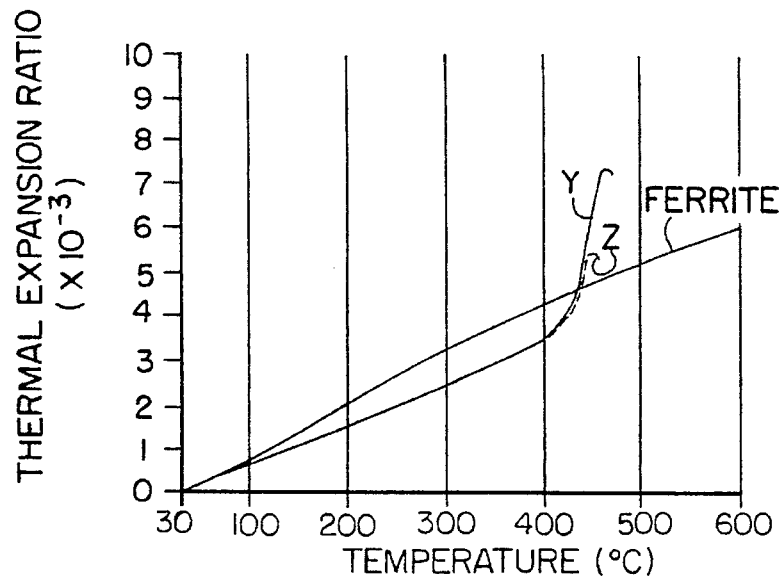
FIG. 2a is a graph showing the relationship between thermal expansion ratio of two kinds of glasses and that of ferrite; and the temperature. In this figure, each glass has a different difference between the thermal expansion ratio at a glass transition temperature and that at the yielding temperature (Δ).
Figure 2B:
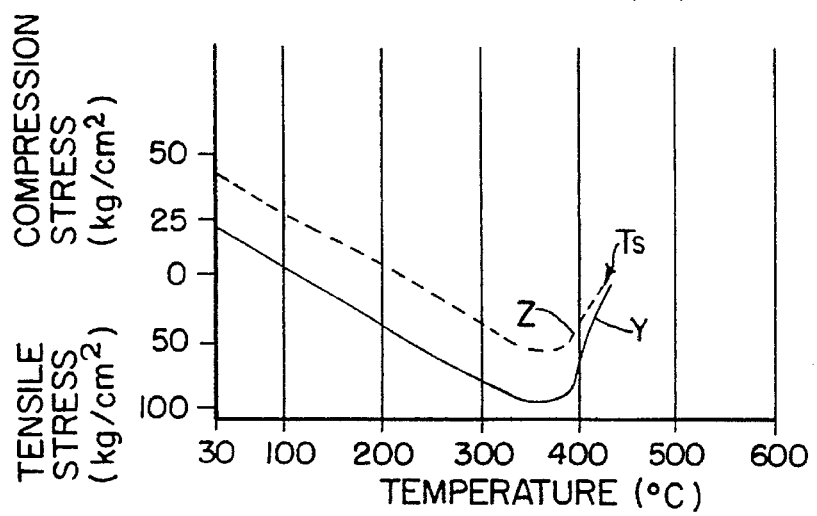
FIG. 2b shows the change of stress applied to the two kinds of glasses in FIG. 2a during the cooling process.

FIG. 2a shows variation curves of the thermal expansion ratio of ferrite and two kinds of glasses, Y and Z. FIG. 2b shows the results obtained by measuring stress applied to the sealing glasses when temperature is decreased after the ferrite is sealed with the sealing glasses.

The setting temperature Ts between the glass transition temperature Tg and the yielding temperature At can be obtained as a temperature at which stress applied to the sealing glasses is O, as shown in FIG. 2b.

When the sealing glass and the substrate began to cool and adhere to each other, stress is applied to the sealing glass due to the difference in the thermal expansion ratio between the sealing glass and the substrate. In the case where the thermal expansion ratio of the sealing glass is larger than that of the substrate ($\alpha_{glass}$>$\alpha_{sub}$), the contraction of the sealing glass is relatively larger than that of the substrate, so that the sealing glass is stretched by the substrate. In contrast, in the case where the thermal expansion ratio of the substrate is larger than that of the sealing glass, the contraction of the substrate is relatively larger than the glass, so that the sealing glass is compressed by the substrate. As is understood from FIG. 2b, as the temperature decreases, stress applied to the sealing glasses varies in the following manner:

First, tensile stress is generated (since the substrate is more readily cooled), and so the tensile stress is increased, then the tensile stress is decreased and converted into compression stress, the compression stress is increased, and only the tensile stress exists at room temperature.

The sealing glass Y is applied with larger tensile stress than that applied to the sealing glass Z during the cooling process.

Among magnetic heads using these two kinds of glasses, more chip cracks were generated in the magnetic head using the sealing glass Y. This fact shows the following:

It is required to use sealing glass to which compression stress is finally applied at room temperature. In addition, it is required to use sealing glass to which great tensile stress is not applied during a cooling process after sealing, since a number of chip cracks may be generated when great tensile stress is applied during the cooling step.

The inventors considered that sealing glass whose thermal expansion ratio is greatly changed in a glass transition region is used, the mechanical strength of the chip after sealing is decreased. Because great tensile stress is applied to the sealing glass Y which has a great difference (difference between the thermal expansion ratio at the glass transition temperature Tg and that at the yielding temperature At: hereinafter, denoted as Δ) between the maximum thermal expansion ratio and the minimum thermal expansion ratio in the glass transition region during the cooling process; and great tensile stress is not applied to the sealing glass Z having small Δ during the cooling process.

EXAMPLE 2

Seven kinds of magnetic heads were manufactured by the process shown in FIGS. 3a–3k. As a substrate, single crystalline ferrite containing 53.75 mol % of $Fe_2O_3$, 29.5 mol % of MnO, and 16.75 mol % of ZnO was used. Thermal characteristics and compositions (% by weight) of the glasses used for sealing seven kinds of magnetic heads are shown in Table 3. In Table 3, $\alpha_{300}$ denotes an averaged thermal coefficient of expansion in the range of 30° C. to 300° C.; $\alpha_{400}$ denotes an averaged thermal coefficient of expansion in the range of 30° C. to 400° C.; $\alpha_{Ts}$ denotes an averaged thermal coefficient of expansion in the range of 30° C. to the glass transition temperature Tg (°C.); denotes the difference between the thermal expansion ratio at the glass transition temperature α(Tg) and the thermal expansion ratio at the yielding temperature α(At). An average thermal coefficient of expansion was measured in accordance with the Japanese Industrial Standard (JIS R3102).

TABLE 3

|  | A | B | C | D | E | F | G | Substrate |
| --- | --- | --- | --- | --- | --- | --- | --- | --- |
| Composition by weight (%) |  |  |  |  |  |  |  |  |
| $SiO_2$ |  |  |  |  | 5 | 5 |  |  |
| $B_2O_3$ | 22 | 22 | 15 | 10 | 8 | 8 | 20 |  |
| PbO | 47 | 37 | 35 | 30 | 43 | 53 | 40 |  |
| ZnO | 9 | 9 | 5 | 5 | 3 | 3 | 5 |  |

TABLE 3-continued

|  | A | B | C | D | E | F | G | Substrate |
|---|---|---|---|---|---|---|---|---|
| Al$_2$O$_3$ |  |  |  |  | 2 | 2 |  |  |
| CdO | 7 | 7 | 10 | 20 | 9 | 9 | 10 |  |
| TeO$_2$ | 10 | 20 | 30 | 35 | 5 | 5 | 25 |  |
| Bi$_2$O$_3$ | 5 | 5 |  |  | 25 | 15 |  |  |
| La$_2$O$_3$ |  |  |  | 5 |  |  |  |  |
| Thermal Properties ($\times 10^{-7}/°C.$) |  |  |  |  |  |  |  |  |
| $\alpha_{3gg}$ | 88 | 98 | 108 | 122 | 98 |  |  | 124 |
| $\alpha_{4gg}$ |  |  |  |  |  |  |  | 119 |
| $\alpha_{Tg}$ | 102 | 114 | 125 | 133 | 108 |  |  |  |
| $\Delta$ | 2.0 | 3.1 | 2.4 | 2.1 | 1.4 | 0.9 | 3.5 |  |

Figure 1:
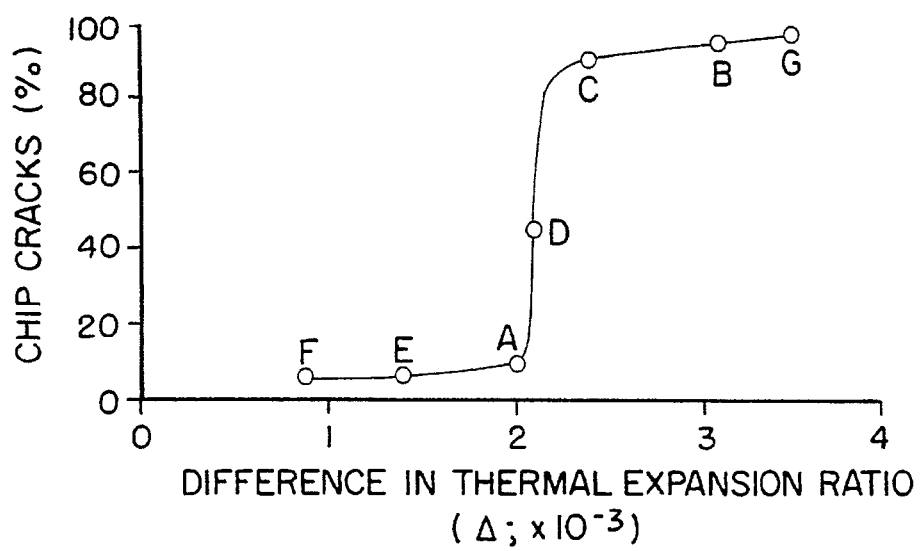
FIG. 1 is a graph showing the relationship between the difference in the thermal expansion ratio in a glass transition region between the sealing glass and ferrite (Δ) used in an example of the present invention; and the percentage of chip cracks generated in the resulting magnetic head.
Figure 3A:
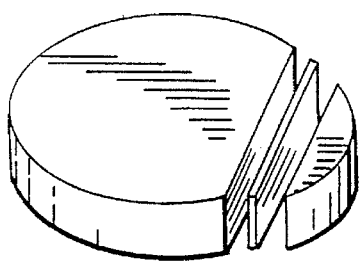
FIGS. 3a–3k show a typical process for manufacturing a magnetic head.
Figure 3B:
Figure 3C:
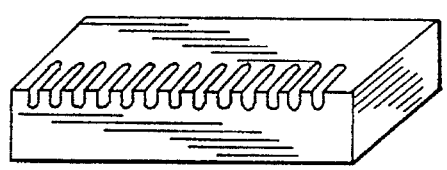
Figure 3D:
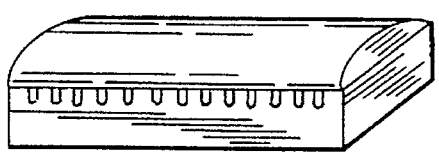
Figure 3E:
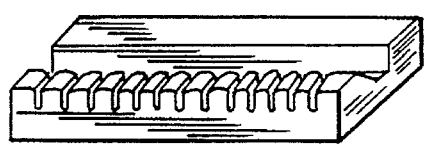
Figure 3F:
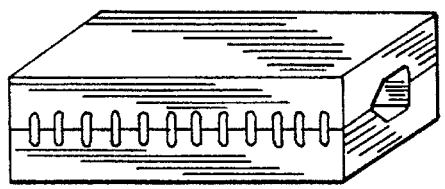
Figure 3G:
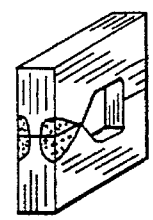
Figure 3H:
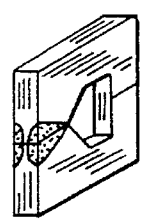
Figure 3I:
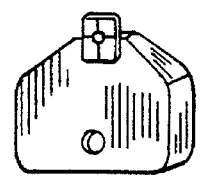
Figure 3J:
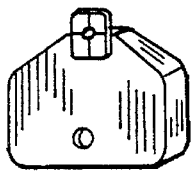
Figure 3K:
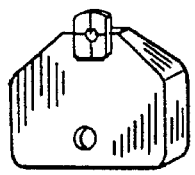

In FIG. 1, the percentage of the chip cracks generated during step of FIG. 3g are plotted against Δ of the sealing glasses when the magnetic heads using seven kinds of sealing glasses are manufactured. It was made clear from this example that chip cracks were reduced when the sealing glass to which great tensile stress was not applied during the cooling process in which the difference Δ between the thermal expansion ratio at the glass transition temperature and that at the yielding temperature of less than $2.0 \times 10^{-3}$ was used, so that the manufacturing yield was improved. In the magnetic head using the sealing glasses A, E, or F, chip cracks were greatly reduced during step 3g and the manufacturing yield was improved.

The same results as those of Example 3 were obtained in the case of an MIG head having a super-structured nitride alloy on the surface of the ferrite substrate, manufactured in the same manner as that of Example 3 except that the step of sputtering the super-structured nitride alloy, which is a magnetic substance with high magnetic permeability and high saturation magnetic flux density, was added between the steps 3b and 3c.

These results show that, the yield of the magnetic head can be improved by the following steps (i) and (ii):

(i) The averaged thermal expansion ratio of the sealing glass in the range of room temperature to a setting temperature of the sealing glass is made smaller than that of the substrate in the range of room temperature to a setting temperature of the sealing glass so that tensile stress is not applied to the sealing glass at room temperature; and (ii) Sealing glass which has small differences Δ between the maximum thermal expansion ratio and the minimum thermal expansion ratio in the glass transition region is selected so that great tensile stress is not applied to the sealing glass during the cooling process.

Figure 5:
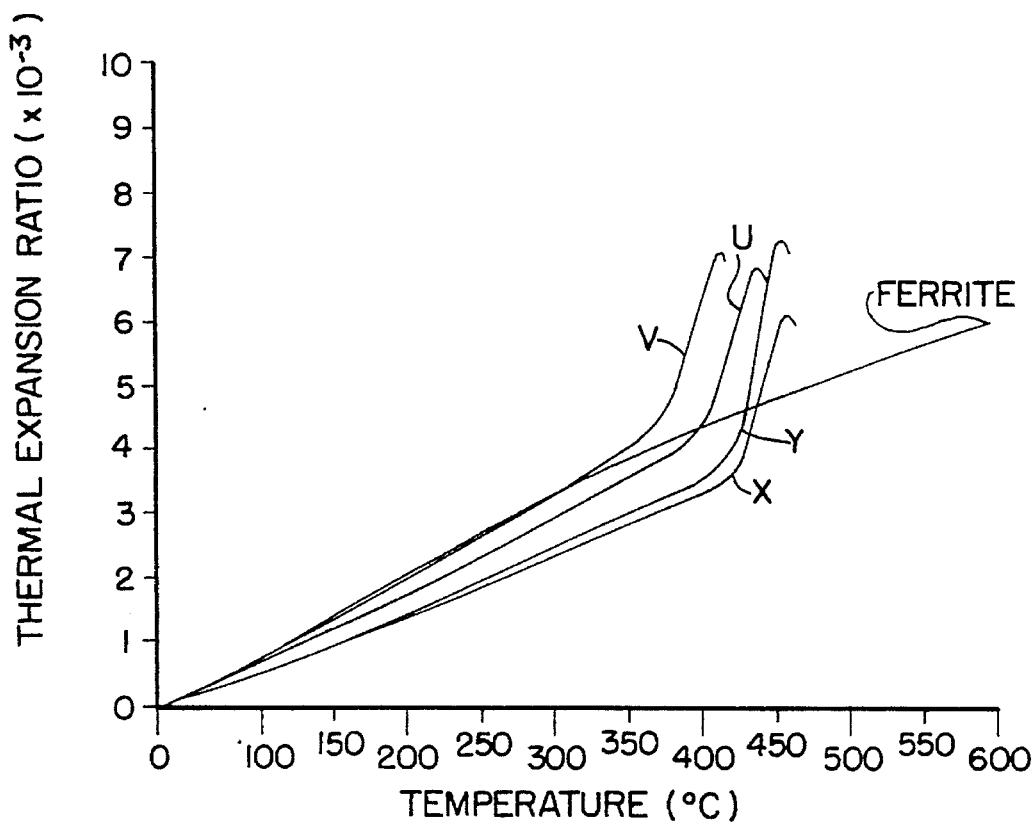
FIG. 5 shows variations in the thermal expansion ratio of a ferrite substrate and four kinds of glasses having different thermal properties depending on temperature.
Figure 6:
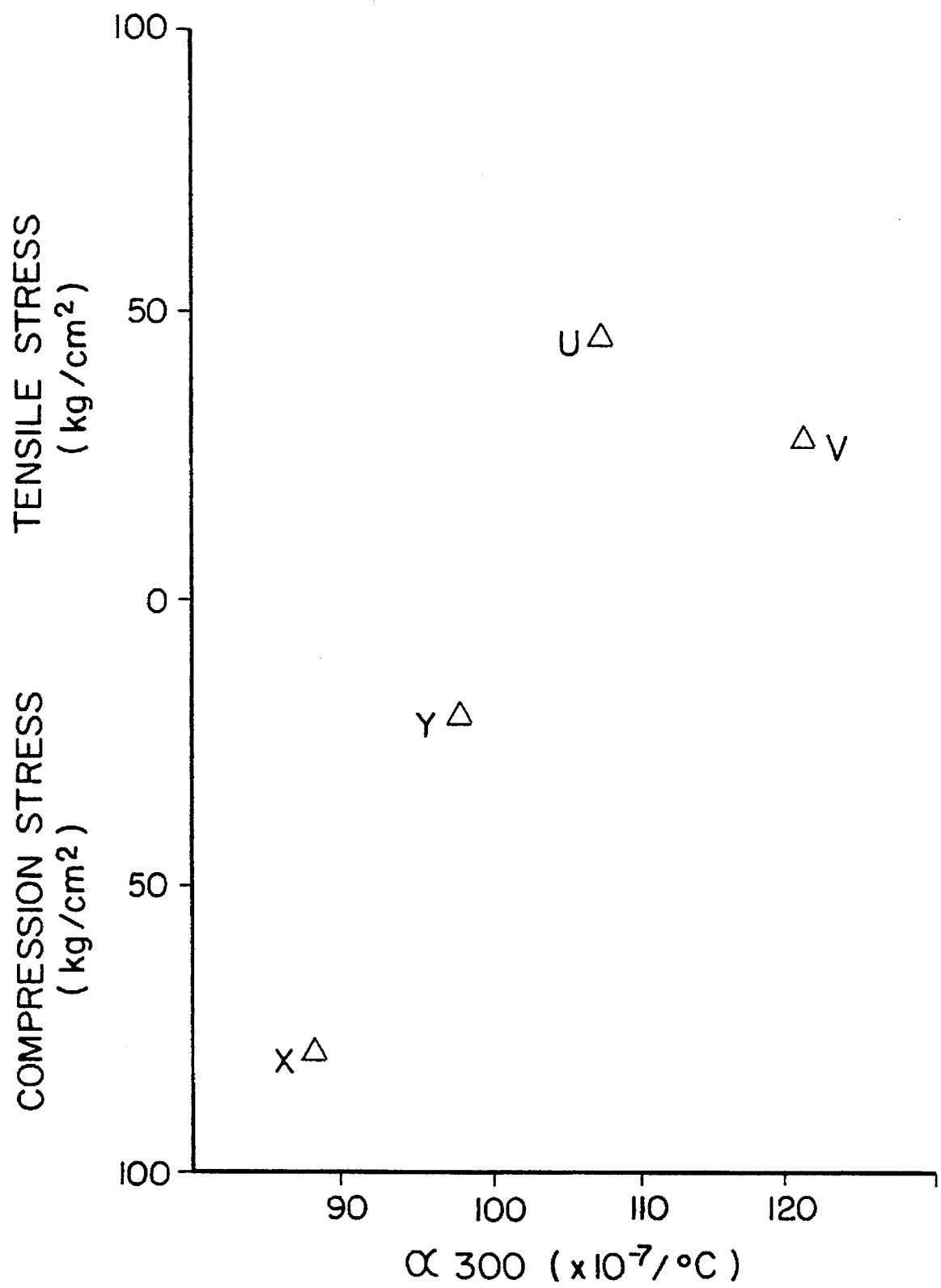
FIG. 6 shows the relationship between the stress after sealing and $\alpha_{300}$ (an averaged thermal coefficient of expansion in the range of 30° C. and 300° C.) of the four kinds of glasses.

In the above-mentioned examples, single crystalline ferrite containing 53.75 mol % of Fe$_2$O$_3$, 29.5 mol % of MnO, and 16.75 mol % of ZnO and having a thermal expansion ratio as shown in FIGS. 2a, 4, and 5 is used. Alternatively, even though a polycrystalline ferrite containing 56.9 mol % of Fe$_2$O$_3$, 35.4 mol % of MnO, and 7.7 mol % of ZnO and having an averaged thermal coefficient of expansion $\alpha_{400}$ of $134 \times 10^{-7}/°C.$, or polycrystalline ferrite containing 50.0 mol % of Fe$_2$O$_3$, 15.0 mol % of NiO, and 35.0 mol % of ZnO and having an averaged thermal coefficient of expansion $\alpha_{400}$ of $85 \times 10^{-7}/°C.$, a manufacturing yield can be improved as long as sealing glass which satisfies the above-mentioned conditions is used. Moreover, if an averaged thermal coefficient of expansion of sealing glass is matched to the material of a substrate, other glasses such as glass containing PbO as its main component, V$_2$O$_5$ type glass, or P$_2$O$_5$ type glass can also be used.

By satisfying the above-mentioned conditions, chip cracks can be reduced irrespective of a glass composition or a substrate composition.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A magnetic head comprising a pair of substrates which are formed of ferrite and sealed with sealing glass, wherein an averaged thermal expansion ratio of said sealing glass in the range of 30° C. to a setting temperature of said sealing glass is smaller than an averaged thermal expansion ratio of the substrate in the range of 30° C. to said setting temperature of said sealing glass; and a difference between a thermal expansion ratio at a glass transition temperature of said sealing glass and a thermal expansion ratio of said sealing glass at a yielding temperature thereof is $2 \times 10^{-3}$ or less.

2. A magnetic head comprising a pair of substrates which are formed of a magnetic substance with magnetic permeability and saturation magnetic flux density on a ferrite substrate and sealed with sealing glass, wherein an averaged thermal expansion ratio of said sealing glass in the range of 30° C. to a setting temperature of said sealing glass is smaller than an averaged thermal expansion ratio of the substrate in the range of 30° C. to said setting temperature of said sealing glass; and a difference between a thermal expansion ratio at a glass transition temperature of said sealing glass and a thermal expansion ratio of said sealing glass at a yielding temperature thereof is $2 \times 10^{-3}$ or less.

3. The magnetic head according to claim 2, wherein the substrates further comprise a superstructured nitride alloy.

4. A magnetic head comprising:

a pair of substrates which are formed of ferrite and sealed with sealing glass, the sealing glass comprising B$_2$O$_3$, PbO, ZnO, CdO, TeO$_2$, and Bi$_2$O$_3$, wherein an averaged thermal expansion ratio of said sealing glass in the range of 30° C. to a setting temperature of said sealing glass is smaller than an averaged thermal expansion ratio of the substrate in the range of 30° C. to said setting temperature of said sealing glass; and a difference between a thermal expansion ratio at a glass transition temperature of the sealing glass and a thermal expansion ratio of a yielding temperature thereof is $2 \times 10^{-3}$ or less.

5. The magnetic head according to claim 4, wherein the sealing glass further comprises SiO$_2$ and Al$_2$O$_3$.

6. The magnetic head according to claim 4, wherein the sealing glass comprises, by percent weight, 22% of $B_2O_3$, 47% of PbO, 9% of ZnO, 7% of CdO, 10% of $TeO_2$ and 5% of $Bi_2O_3$.

7. The magnetic head according to claim 5, wherein the sealing glass comprises, by percent weight, 5% of $SiO_2$, 8% of $B_2O_3$, 43% of PbO, 3% of ZnO, 2% of $Al_2O_3$, 9% of CdO, 5% of $TeO_2$ and 25% of $Bi_2O_3$.

8. The magnetic head according to claim 5, wherein the sealing glass comprises, by percent weight, 5% of $SiO_2$, 8% of $B_2O_3$, 53% of PbO, 3% of ZnO, 2% of $Al_2O_3$, 9% of CdO, 5% of $TeO_2$ and 15% of $Bi_2O_3$.

9. The magnetic head according to claim 4, wherein the substrates formed of ferrite comprise $Fe_2O_3$, MnO and ZnO.

10. The magnetic head according to claim 4, wherein the substrates formed of ferrite comprise $Fe_2O_3$, NiO and ZnO.

11. The magnetic head according to claim 4, wherein the substrates further comprise a superstructured nitride alloy.

* * * * *

UNITED STATES PATENT AND TRADEMARK OFFICE
CERTIFICATE OF CORRECTION

PATENT NO.    : 5,606,479

DATED         : February 25, 1997

INVENTOR(S)   : Yasuo Mizuno et al.

It is certified that error appears in the above-identified patent and that said Letters Patent is hereby corrected as shown below:

Column 7, Table 3, line 9, change "$a_{3gg}$" to --$a_{300}$--.

Column 7, Table 3, line 10, change "$a_{4gg}$" to --$a_{400}$--.

In The Claims:

Claim 4, Column 8, lines 63-65, change "the sealing glass and a thermal expansion ratio of a yielding temperature" to --said sealing glass and a thermal expansion ratio of said sealing glass at a yielding temperature--.

Signed and Sealed this

Second Day of September, 1997

*Attest:*

BRUCE LEHMAN

*Attesting Officer*   Commissioner of Patents and Trademarks